C. HEMENWAY.
PLOW.
APPLICATION FILED MAY 3, 1915.
1,185,504.
Patented May 30, 1916.
2 SHEETS—SHEET 2.
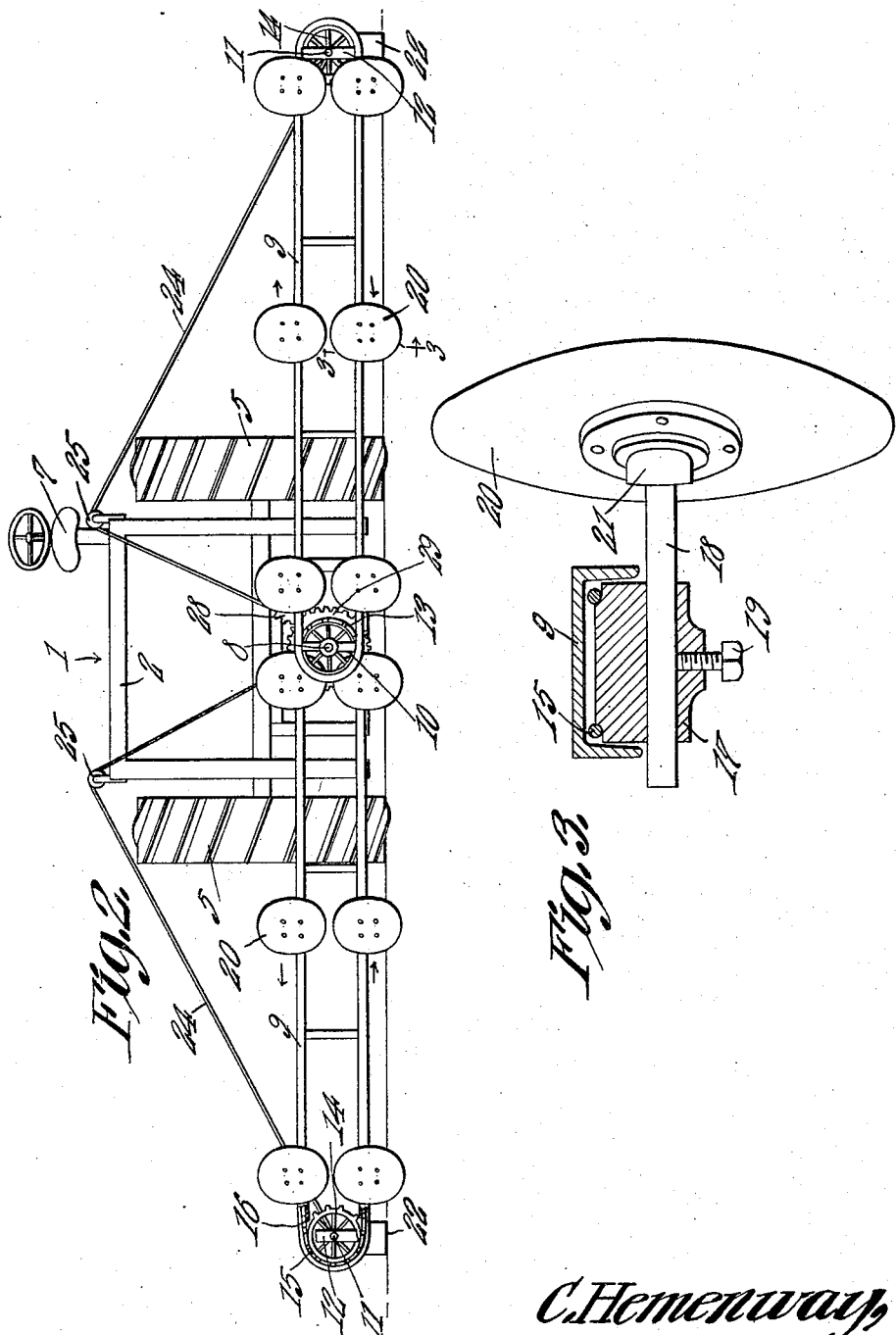
Witnesses
C. Hemenway,
Inventor
by C.A. Snow & Co.,
Attorneys

United States Patent Office.

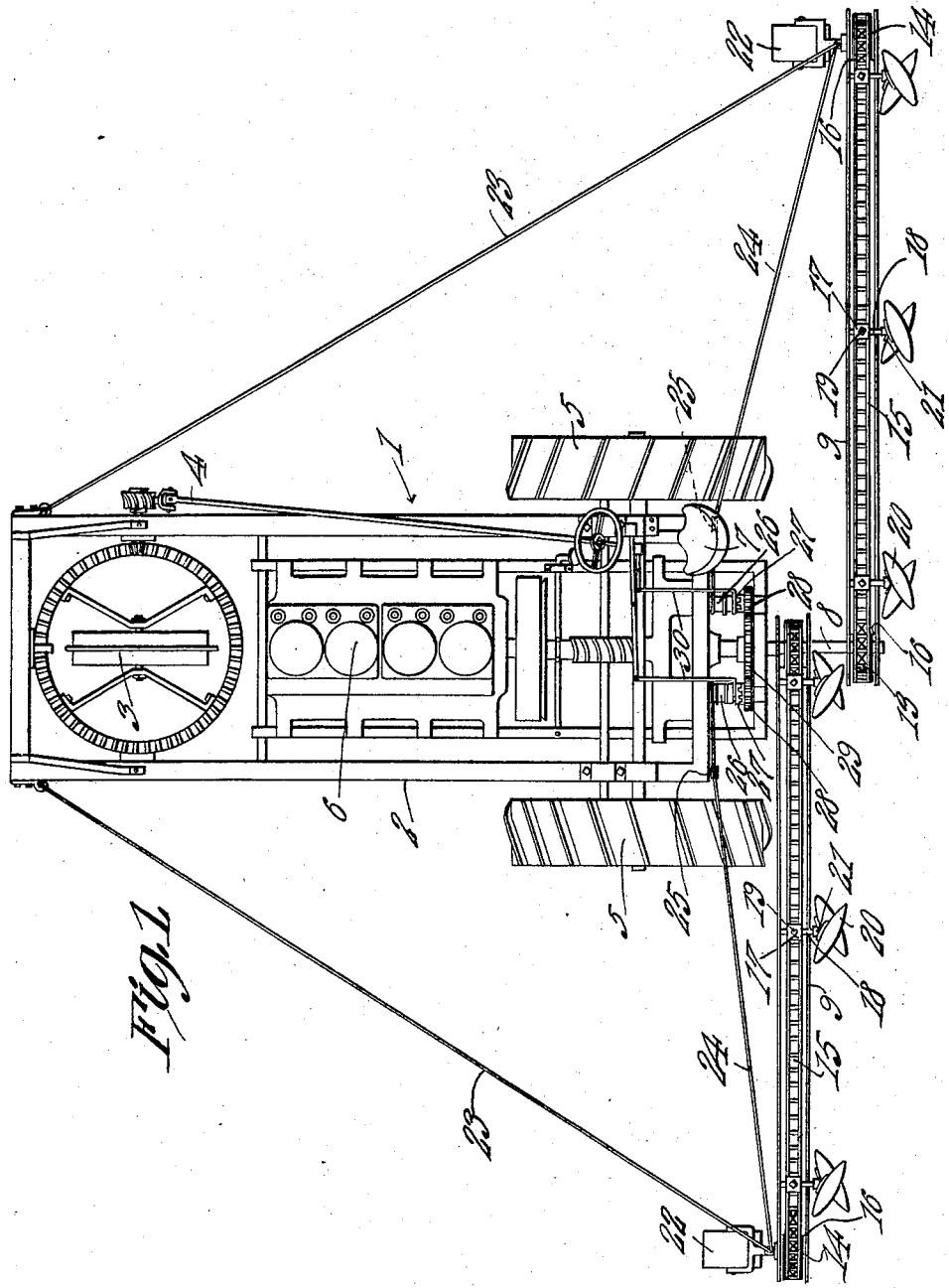

CHARLES L. HEMENWAY, OF COVELO, CALIFORNIA.

PLOW.

1,185,504.

Specification of Letters Patent.

Patented May 30, 1916.

Application filed May 3, 1915. Serial No. 25,544.

*To all whom it may concern:*

Be it known that I, CHARLES L. HEMENWAY, a citizen of the United States, residing at Covelo, in the county of Mendocino and State of California, have invented a new and useful Plow, of which the following is a specification.

The present invention appertains to agricultural machines, and aims to provide a novel and improved tractor or power plow.

It is the object of the invention to provide a tractor plow embodying dirt working elements mounted for transverse movement and actuated by the engine or prime mover of the tractor, in order that the soil will be worked or tilled thoroughly, the earth tilling elements being arranged to not only properly work the soil, but to also assist in the forward propulsion of the machine, to effect a saving of power.

It is also within the scope of the invention to provide an agricultural machine of the nature above indicated, having novel means for carrying the earth tilling elements, means for adjusting the same, means for guiding them for proper movement, and other improved features of construction to enhance the utility and efficiency of the machine.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein:—

Figure 1 is a plan view of the improved agricultural machine. Fig. 2 is a rear view thereof, portions being removed and broken away. Fig. 3 is an enlarged sectional view taken approximately on the line 3—3 of Fig. 2.

In carrying out the invention there is employed a suitable tractor 1, embodying the frame 2 supported at its forward end by the steering 3 which may be angled by the steering gear 4. The rear end of the frame 2 is supported by a pair of tractor wheels 5, which are operatively connected to the internal combustion engine or prime mover 6 carried by the frame 2. An operator's seat 7 is carried by the rear end of the frame 2 and the controlling means of the steering gear, transmission and the like, are within the control of the operator in the manner of an ordinary tractor or self-propelled vehicle.

A driving shaft 8 which is operatively connected to the engine or mortor 6 is journaled through the rear end of the frame 2 and projects rearwardly therefrom, and a pair of oppositely projecting lateral guides or frames 9 have their inner or adjacent ends journaled or mounted upon the protruding portion of the shaft 8 to enable the guides 9 to oscillate vertically. Each of the guides 9 is preferably constructed of channel iron having upper and lower parallel portions and having rounded or curved ends between said portions, and the flanges of the guide member 9 project outwardly or are outturned with respect to the guide. Those ends of the guides 9 which are carried by the shaft 8, are provided with suitable bearings 10 journaled upon the said shaft, the guides 9 being spaced apart in different transverse planes, and the two guides project toward the opposite sides.

Bearings 12 are carried by the free end portions of the guides 9 and short countershafts 11 are journaled through the bearings 12 to be carried by the free or remote ends of the guides. Sprocket wheels 13 are keyed upon the shaft 8 within the adjacent ends of the guides 9, and sprocket wheels 14 are carried by the shafts 11 within the free end portions of the guides. Endless sprocket chains 15 are mounted for movement within the guides 9 and are passed around the respective sprocket wheels 13 and 14, the ends of the webs of the guides 9 being cut away, as at 16, in order that the sprocket chains may engage the sprocket wheels properly. The sprocket chains, in traveling within the guides 9, will be carried through a circuitous path, the lower runs of the sprocket chains being moved inwardly or from the free ends of the guides 9 to the adjacent ends thereof, while the upper runs of the sprocket chains will naturally move outwardly or toward the free or remote ends of the guides.

Attached to the sprocket chains 15 at suitably spaced points therealong, are blocks 17 through which rearwardly projecting shanks 18 are engaged, set screws 19 being carried by the blocks 17 for clamping the shanks 18 in place. When the set screws 19 are loosened, the shanks 18 may be adjusted longitudinally of themselves or may be rotated for properly setting the canted dished disks 20 carried by the rear ends of the shanks 18. The disks or soil working elements 20 are rotatably carried by the shanks 18, suitable bearings 21 being employed for mounting the disks 20 upon the rear ends of the shanks 18. The disks 20 are canted, or lie in oblique planes, and the concaved faces of the disks are disposed rearwardly. The disks or soil working elements 20 will be carried by the sprocket chains 15 around the guides 9 and the blocks 17 which carry the disks working within the guides, will properly guide the disks.

The disks 20 are properly set or adjusted in order that the lower disks which move inwardly in engagement with the soil will not only properly work the same, but will also assist in the propulsion of the tractor, due to the fact that the canted or oblique disks 20 in impinging against the soil will by their movement assist in propelling the machine. Consequently, the power necessary for propelling the machine, will be reduced materially, which effects a saving of fuel, and furthermore, the tractor may be made lighter, so as to reduce the tendency of the tractor to pack the soil which is objectionable. The side thrust of the disks or soil working elements is thus utilized in assisting in propelling the machine, it being understood that in ordinary plows, the side thrust creates a drag resulting in a considerable loss of power.

Ground wheels 22 are carried by the free or remote ends of the guides 9 and lie in advance thereof, to run upon the soil, in advance of the furrows made by the disks 20, so that the guides 9 will be properly supported with the lower disks engaging the soil. Stay rods 23 are loosely connected at their ends to the free ends of the guides 9 and the forward end of the tractor frame 2, for preventing the guides from flexing forwardly or rearwardly out of proper position, but the rods 23 do not prevent the guides 9 being swung vertically.

A mechanism is employed for raising the guides 9 when it is desired to render the soil working elements inoperative, and to this end, cables or flexible elements 24 are attached to the free ends of the guides 9, and are passed over pulleys or guides 25 carried by the rear end of the frame 2. The cables 24 are attached to reels or drums 26 journaled to the frame 2, and the reels 26 are adapted to be connected by means of suitable clutches 27 to gears 28 which intermesh with a gear 29 secured upon the driving shaft 8. Suitable manually operable devices 30 may be employed for operating the clutches 27, whereby the reels 26 may be readily connected to and disconnected from the driving shaft 8. The reels 26, however, may be actuated or controlled in any suitable manner for winding the cables 24 thereon so as to raise the free ends of the guides 9 and to allow the cables 24 to unwind when it is desired to lower the said guides.

The tractor wheels 5 and sprocket chains 15 are so geared to the engine 6 that the sprocket chains are moved much faster than the tractor wheels, whereby the soil working elements will be moved much faster than the tractor is propelled forwardly. When the sprocket chains 15 are actuated, the disks or soil working elements 20 will be carried downwardly around the free or remote ends of the guides 9 or around the sprocket wheels 14, and will then be moved inwardly or toward the shaft 8. The lower disks 20 will engage the soil and due to the fact that the disks are moved inwardly and at the same time the machine is propelled forwardly, the disks will cut diagonal furrows in the soil and will turn or work the soil rearwardly, and at the same time, the disks 20 in bearing against the soil when turning the same rearwardly, will assist in propelling the machine. When the disks reach the inner ends of the guides 9, they will be carried upwardly onto the upper portions of the guides 9 and move back to starting position at the free ends of the guides. The two sets of disks or soil working elements 20 are thus carried through circuitous paths, to provide a continual working of the soil during the propulsion of the machine. The wheels 22 properly support the guides 9 so that the lower disks will properly operate upon the soil, and when it is desired to render the disks 20 inoperative, the guides 9 may be raised.

The present machine is of advantage over an ordinary gang plow, in view of the fact that less draft will be created by the soil working elements, and for the further reason that the soil working elements assist in moving the machine forwardly. The opposite sets of soil working elements move in opposite directions, to eliminate any side thrust upon the tractor 1. The guides 9 may be swung upward when the machine is being turned, and by detaching the parts 9, 13, 23 and 24 from the tractor 1, the tractor may be employed as an ordinary tractor.

It will be noted that the blocks 17 in running within the upper portions of the guides 9 will support the soil working elements and upper runs of the sprocket chains, and the blocks 17 in working in the lower portions of the guides will prevent the soil working elements or disks 20 from being forced upwardly out of the soil. The lower portions of the guides thus hold the soil working disks or elements 20 in proper operative engagement with the soil. The disks 20 may be set at various angles by adjusting the shanks 18 within the blocks 17, and if desired the disks 20 may be removed and replaced by other soil working elements.

Having thus described the invention, what is claimed as new is:—

An agricultural machine embodying a guide, an endless sprocket chain working within the guide, blocks secured to the sprocket chain and guided by the guide, rearwardly projecting shanks fitted slidably and rotatably in said blocks, means carried by the blocks for clamping the shanks, and rotary canted disks carried by the rear ends of said shanks.

In testimony that I claim the foregoing as my own, I have hereto affixed my signature in the presence of two witnesses.

CHARLES L. HEMENWAY.

Witnesses:
HENRY W. MONTAGUE,
GEORGE CONRAD.

Copies of this patent may be obtained for five cents each, by addressing the "Commissioner of Patents, Washington, D. C."